(12) United States Patent
Kovalenko et al.

(10) Patent No.: US 12,447,836 B2
(45) Date of Patent: Oct. 21, 2025

(54) POWER AND ACTUATION CONTROL DEVICE FOR HIGHLY AUTOMATED VEHICLES

(71) Applicant: OBSCHESTVO S OGRANICHENNOJ OTVETSTVENNOSTJU "EVOKARGO", Moscow (RU)

(72) Inventors: Vladimir Aleksandrovich Kovalenko, Moscow (RU); Dmitrij Evgenevich Ramenskij, Moscow (RU); Nikita Andreevich Savostjanov, Moscow (RU); Sergej Fedorovich Tarasov, Moscow (RU); Dmitrij Alekseevich Fedirko, Moscow (RU)

(73) Assignee: OBSCHESTVO S OGRANICHENNOJ OTVETSTVENNOSTJU "EVOKARGO", Moscow (RU)

( * ) Notice: Subject to any disclaimer, the term of this patent is extended or adjusted under 35 U.S.C. 154(b) by 0 days.

(21) Appl. No.: 18/713,661

(22) PCT Filed: Oct. 20, 2022

(86) PCT No.: PCT/RU2022/000317
§ 371 (c)(1),
(2) Date: May 27, 2024

(87) PCT Pub. No.: WO2023/158338
PCT Pub. Date: Aug. 24, 2023

(65) Prior Publication Data
US 2025/0042270 A1 Feb. 6, 2025

(30) Foreign Application Priority Data
Feb. 17, 2022 (RU) ................... 2022104176

(51) Int. Cl.
*B60L 50/75* (2019.01)
(52) U.S. Cl.
CPC .................... *B60L 50/75* (2019.02)
(58) Field of Classification Search
None
See application file for complete search history.

(56) References Cited

U.S. PATENT DOCUMENTS

2005/0100767 A1\* 5/2005 Stolmar ............ H01M 8/04082
429/515
2006/0138993 A1\* 6/2006 Gandrud ................ B60L 50/40
318/727

(Continued)

FOREIGN PATENT DOCUMENTS

| EA | 031538 | 1/2019 |
| RU | 152189 | 5/2015 |
| RU | 2623284 | 6/2017 |
| RU | 2738965 | 12/2020 |
| WO | 2019/083513 | 5/2019 |

OTHER PUBLICATIONS

Mar. 2, 2023 International Search Report issued in International Application No. PCT/RU2022/000317, pp. 1-2.

(Continued)

*Primary Examiner* — Rexford N Barnie
*Assistant Examiner* — Joel Barnett
(74) *Attorney, Agent, or Firm* — Nixon & Vanderhye PC

(57) ABSTRACT

The invention relates to a power and actuator control device for a highly automated vehicle (HAV). The device comprises a housing divided into 4 units. The first unit contains a connector for connection of a traction battery, a connector for connection of hydrogen fuel cells, a connector for connection to a traction motor inverter, a 12 V power supply and a 24 V power supply. The second unit contains a rechargeable lithium battery and a supercapacitor module. The third unit contains a high-level controller. The fourth (Continued)

unit contains an inverter. The power supplies are connected by their inputs to outputs of the connector for connection of a traction motor inverter and the connector for connection of hydrogen fuel cells. The inverter has an output for connection of a pneumatic system of the HAV and an input for connection of an onboard control computer. The rechargeable lithium battery and the supercapacitor module provide backup power for the high-level controller. The result is more reliable control of the electrical systems of a highly automated vehicle.

3 Claims, 1 Drawing Sheet

(56) References Cited

U.S. PATENT DOCUMENTS

| | | | |
|---|---|---|---|
| 2017/0090530 A1* | 3/2017 | Filser | H02J 7/342 |
| 2018/0170188 A1* | 6/2018 | Uneme | B60L 53/22 |
| 2018/0304734 A1* | 10/2018 | Sumikawa | H01M 10/625 |

OTHER PUBLICATIONS

Mar. 2, 2023 Written Opinion issued in International Application No. PCT/RU2022/000317, pp. 1-4.

* cited by examiner

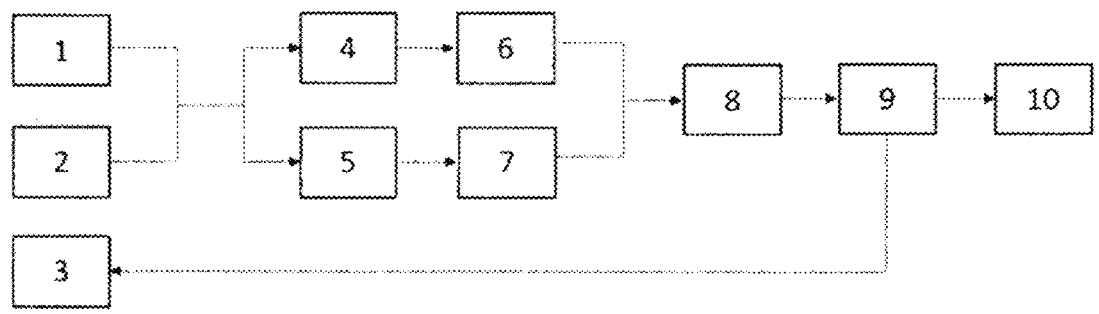

POWER AND ACTUATION CONTROL DEVICE FOR HIGHLY AUTOMATED VEHICLES

FIELD OF THE INVENTION

An invention relates to a control unit for power and actuators of highly automated vehicles (hereinafter HAV) belongs to the field of the automotive industry and is designed to control electric drives of electric vehicles, power low-current on-board systems, charge a high-voltage traction battery, and control a braking system and a steering rack servo.

BACKGROUND

A power supply device is known from the prior art, comprising a storage battery; a capacitor unit in which a first capacitor and a second capacitor are connected in series between a positive terminal and a negative terminal of the storage battery; a power converter including a U-phase, a V-phase, and a W-phase connected to the storage battery in parallel, the U-phase, the V-phase, and the W-phase being three-level inverters respectively, and each of the three-level inverters including: a first switching element, a second switching element, a third switching element, and a fourth switching element connected in series; a first diode of which a cathode is connected to a wiring connecting the first switching element and the second switching element and of which an anode is connected to a wiring connecting the first capacitor and the second capacitor; and a second diode of which an anode connected to a wiring connecting the third switching element and the fourth switching element and of which a cathode is connected to a wiring connecting the first capacitor and the second capacitor, each of the three-level inverters being configured to selectively output, to a motor generator, a voltage of any one of three different voltage values by switching on and off each of the first switching element, the second switching element, the third switching element, and the fourth switching element; a control device configured to control a switching on and off of each of the first switching element, the second switching element, the third switching element, and the fourth switching element of the power converter; a first connection terminal electrically connected to a P terminal of a direct current charger and located between the first switching element and the second switching element in any one of the U-phase, the V-phase, and the W-phase; and a second connection terminal electrically connected to an N terminal of the direct current charger and located between the third switching element and the fourth switching element in another one of the U-phase, the V-phase, and the W-phase. (RU 2738965 C1, Dec. 21, 2020).

A four-wheel drive electric vehicle control device is known from the prior art that includes a drive source having a motor/generator, and an electronically controlled coupling provided on a drive power transmission path leading from the drive source to front and rear wheels, the electronically controlled coupling being configured to control a power distribution of the front and rear wheels in accordance with a transmission torque command value comprising: a four-wheel drive power distribution control unit programmed to output the transmission torque command value to the electronically controlled coupling to bring about a four-wheel drive state, the four-wheel drive power distribution control unit including a regenerative control intervention-coordinating controller programmed to bring a transmission torque of the electronically controlled coupling to zero before initiating a regenerative control by the motor/generator when the regenerative control is executed during the four-wheel drive state (RU 2623284 C1, Jun. 23, 2017).

The disadvantage of the prior art consists in that the known power and actuation control devices are not structurally separate and functionally complete parts of the electronic equipment of an unmanned vehicle, while the claimed solution allows for the integration of functions designed for automatic control or actuation control to ensure the movement and operation of HAV.

SUMMARY

The claimed invention solves the problem of creating a power and actuation control device that is a structurally separate and functionally complete, and it allows for the integration of functions designed for automatic control or actuation control to ensure the movement and operation of HAV.

The technical result achieved by the claimed technical solution is to increase the control reliability of HAV electrical systems due the centralized control of electrical systems implemented in a single compact case.

This is achieved due to the fact that the HAV power and actuation control device contains a case divided into 4 blocks: the first block contains a connector for a traction battery, a connector for hydrogen fuel cells, a connector to link a traction motor to an inverter; a 12V power supply and a 24V power supply, while the power supplies are connected by their inputs to the terminals of traction battery and hydrogen fuel cells connectors; the second block contains a lithium battery and a supercapacitor module to provide backup power to the upper-level controller; the third block contains an upper-level controller; the fourth unit contains an inverter with an input for connecting a HAV pneumatic system and an input for connecting the on-board computer.

The case is also designed to be waterproof.

The cover of the first block contains a block status indicator and a turn-on switch.

BRIEF DESCRIPTION OF THE DRAWINGS

FIG. 1 shows a general view of the power and actuation control device.

DETAILED DESCRIPTION OF THE INVENTION

The technical solution is a power and actuation control device that is a structurally separate and functionally complete, and it allows for the integration of functions designed for automatic control or actuation control to ensure the movement and operation of HAV.

The power and actuation control device consists of four interconnected blocks, each comprising a case with a cover, combined into a single module. Each block case can also contain outputs and inputs for connecting HAV electrical systems; indicators, buttons and levers for controlling the block.

The HAV power and actuation control device comprises as shown on FIG. 1:

The first block with three external connectors: the first (1) one for connecting a traction battery, the second (2) one for connecting hydrogen fuel cells, and the third (3) one for connecting a traction motor to the inverter. The cover of the first block contains a block status indicator and a turn-on switch. 12V (4) and 24V (5) power supplies are located inside the case of the first block, and the wiring is disposed therein. This block is designed to convert the 400V DC voltage of the traction battery into 12V and 24V to provide power to HAV systems. The second block contains a lithium rechargeable battery (6), a supercapacitor module (7), which is a backup power source; and two control relays that function as breakers. This block provides backup power to the upper-level controller as part of the third module, in case of a traction battery power malfunction.

The third block contains an upper-level controller (8) and at least one fuse panel (9). The upper-level controller in this module provides the following:
  setting the torque of the traction motor;
  power control of the entire HAV system;
  brake system control;
  control of steering rack rotation servo;
  switching of lighting devices;
  control of information coming from HAV sensors and transmission of data from sensors to the on-board control computer (HAV autopilot).

The fourth block contains an inverter (10) that allows converting 24 V DC to 220 V AC to provide power to the HAV pneumatic systems; and two connectors for the on-board computer (hereinafter referred to as the control system) and the HAV pneumatic system.

The essence of the claimed invention is demonstrated in FIG. 1.

FIG. 1 shows a general view of the power and actuation control device.

The claimed technical solution is implemented as follows: The voltage from the traction battery is supplied to the first block input by linking the traction battery to the connector (1), then power units 2 and 3 convert the voltage to 12V and 24V, which is supplied to the input of the upper-level controller 11; in accordance with the signals received from the control system and the information from the sensors, the controller generates the appropriate signals to control the HAV actuators and monitors the execution of generated signals based on information received from the sensors.

Therefore, the presented invention ensures increased reliability of control of HAV electrical systems due to the implementation of centralized control embodied in a single compact case.

The invention claimed is:

1. A power and actuation control device for a highly automated vehicle comprising a case divided into 4 blocks, wherein
  the first block contains a connector for a traction battery, a connector for hydrogen fuel cells, a connector for linking a traction motor to an inverter, a 12V power supply and a 24V power supply;
  the power supplies are connected by their inputs to the outputs of a traction battery and hydrogen fuel cells;
  the second block contains a lithium battery and a supercapacitor module to provide backup power to an upper-level controller;
  the third block contains the upper-level controller;
  the fourth block contains an inverter with an output for a HAV pneumatic system and an input for an on-board control computer.

2. The power and actuation control device for a highly automated vehicle according to claim 1, wherein the case is made waterproof.

3. The power and actuation control device for a highly automated vehicle according to claim 1, wherein a block status indicator and a switch are located on the cover of the first block.

* * * * *